United States Patent [19]

Vinciguerra

[11] Patent Number: 5,044,407
[45] Date of Patent: Sep. 3, 1991

[54] MAIN LEVER FOR A ROTARY DOBBY OPERATING AT HIGH SPEED

[75] Inventor: Costantino Vinciguerra, Florence, Italy

[73] Assignee: Nuovopignone Industrie Meccaniche e Fonderia S.p.A., Florence, Italy

[21] Appl. No.: 508,808

[22] Filed: Apr. 12, 1990

[30] Foreign Application Priority Data

Apr. 18, 1989 [IT] Italy .................................. 20187 A/89

[51] Int. Cl.$^5$ ............................................. D03D 1/00
[52] U.S. Cl. ................................. 139/66 A; 74/42; 74/519
[58] Field of Search ................ 139/66 R, 66 A, 79, 139/80, 81; 74/42, 519

[56] References Cited

U.S. PATENT DOCUMENTS 3,958,608  5/1976  Rohr .................................. 139/66 R
4,770,584  9/1988  Vinciguerra ........................ 411/366

FOREIGN PATENT DOCUMENTS

0274971  7/1988  European Pat. Off. .......... 139/66 R

Primary Examiner—Andrew M. Falik
Attorney, Agent, or Firm—Morgan & Finnegan

[57] ABSTRACT

A main lever for a high-speed rotary dobby having two opposing sidepieces in which two corresponding opposing frusto-conically flared holes are formed in each side piece by pressing or milling for a removable main pin for coupling the lever to the dobby crank arm. Two inner annular recesses concentric with the holes are also formed for housing a bearing of increased axial length. The sidepieces are joined together without welding by a special annular spacer hub acting as the fulcrum for the lever and, at the free end of the curved guide for the slider which adjusts the travel of the heddle frames, by a spacing and vibration-damping block. The slider passes between the two sidepieces in the curved guide zone and is locked in position by a special locking device. Lever modifications and special reinforcements are also provided.

7 Claims, 5 Drawing Sheets

MAIN LEVER FOR A ROTARY DOBBY OPERATING AT HIGH SPEED

This invention relates to a new main lever which is extremely strong structurally and economic, and able to support high loads by using bearings of greater axial length than normal, and which in addition uses a removable main coupling pin between the lever and its crank arm and a special slider of shorter length which besides reducing the overall length of the entire dobby widens its adjustment range, making it therefore particularly suitable for rotary dobbies operating at high speed.

BACKGROUND OF THE INVENTION

In modern high-speed looms using rotary dobbies each heddle frame has a crank arm operated by a rotating cam, which itself controls an adjustment lever known as the main lever, transmitting motion either directly or indirectly via transmission levers to the members which raise said heddle frames in the loom. In such high-speed looms generally up to twenty frames are operated with a standardized 12 mm axial pitch and lifts, which increase starting from the frame closest to the fabric. This variation in lift is obtained by forming curved adjustment guides on the main levers which are stacked one against the other at a pitch of 12 mm on a shaft passing through their central fulcrum, then fixing adjustable sliders on said guides at different distances from the fixed central fulcrum of said main levers. The hinge for the control rods for the lever mechanisms which operate the frames is provided on said adjustable sliders, the desired adjustment in the stroke or lift of the frames therefore being obtained by this variation in the stroke of said control rods.

Inertial forces of the order of some hundreds of kg produced by the movement of the frames, ie where the movements are a maximum, plus the inertial forces of the operating levers all act on the crank arms where the movements are a minimum, to thus produce maximum force, this being of the order of 1000 kg, with the result that the main coupling pins between the crank arms and the relative main levers are the most stressed components of the entire linkage. To this must be added the difficulty of constructing such a main pin because of the standardized 12 mm axial pitch which means the coupling pins must have a length not exceeding 12 mm. Finally, as the force acting on the main pin increases as the cube of the rotational speed of the loom, it is apparent that such main pins are the most critical point of high-speed rotary dobbies, and are able to affect and limit the operating speed of the dobby and hence of the loom.

In the current state of the art relating to high-speed rotary dobbies, the crank arms are generally constructed of solid steel of 6 mm thickness and the main levers, stacked together as stated at a pitch of 12 mm, are also of solid steel of thickness slightly less than said maximum axial dimension of 12 mm to prevent harmful mutual rubbing during operation. A cavity forming two cheeks with a thickness of about 2.5 mm at about 6 mm apart is machined into each of said main levers so that they can receive between them the big end of the relative crank arm which is pivoted thereat by a main through coupling pin passing through corresponding holes in said cheeks and through the central hole of a bearing totally filled with rollers, or of a bush, which had been previously inserted into its housing in the crank arm big end, said main pin then being irremovably fixed in position by clinching it against said two cheeks.

From the aforegoing it is apparent that as said cavity cannot have an axial width greater than about 6 mm without excessively weakening the two cheeks against which the main pin has to discharge the clinching force, said rotation bearing, which acts as an articulated joint between the crank arm and the main lever, cannot have an axial thickness exceeding about 6 mm. The consequence of this limitation is that if, as is currently sought, it is required to increase the loom speed and consequently the speed of its dobby, which for equal frame lifts results in considerably increased loads which, as known, increase with approximately the cube of the speed, the only possible means for increasing the load capacity of the bearing is to increase its diameter, with a consequent equal increase in the entire lever and thus in the size of the entire dobby, resulting in considerably increased dobby space requirements and cost.

A further important drawback of current main levers of solid steel plate is their high cost due to the fact that they have to be completely machined over all their surfaces.

In addition to the cost of contouring the outer profile, which has to be very accurate in the curved guide zone for the slider, and the cost of providing said cavities for housing the big ends of the crank arms, there are also the high costs of the machining required for reducing thicknesses, which have to be different for the various surfaces of the lever. This is because to be able to mount the slider on the main lever, this must be reduced in thickness in its curved slider guide part from 12 mm to about 7 mm, so that the two sides of the two 2 mm thickness cheeks of the slider can pass over it, the slider having a standardized thickness of about 11 mm to prevent any contact with or dragging by the adjacent sliders. Additional costs are due, finally, to the necessity of machining all the other surfaces of the connecting rod to reduce the thickness from 12 mm to 11 mm, still to avoid friction between adjacent levers in operation. In known main levers of the state of the art, the slider can be hinged to the arm driving the levers which operate the frames only at the end facing the loom, whereas in certain applications it would be convenient for this hinging to be at the other end, ie at the dobby end, and in addition the slider is locked in position along the curved guide by press screws acting directly and perpendicularly against the approximately 6 mm edge at the dobby end of the guide, with consequent considerable extension in the direction transverse to said guide, this limiting the travel of the slider along the guide and thus reducing the adjustment range in order to prevent interference between said screws and the crank arms.

Other drawbacks are the impossibility in known main levers of forming their fulcrum zone in a material other than that of the lever body itself, an in particular a material which can be surface-treated to improve its wear resistance, this being very important as this is precisely the zone which supports the thrust of the adjacent levers. In addition, as the two cheeks of the machined cavity in the lever for housing the big end of the crank arm are rigid and cannot be moved elastically apart and moreover cannot be provided with the necessary inner frusto-conical flaring or suitable inner annular recessing, not only do they not allow the use of removable pins such as those described in the prior U.S. Pat. No. 4,770,584 issued on Sept. 13, 1988, by the present applicant for coupling the crank arm to the main lever, and which would allow simple replacement of worn bearings, but they also do not allow the use of bearings with a thickness increased from 6 to 8 mm for higher loads.

A final drawback is that the necessary considerable reduction in the thickness of the lever curved guide from 12 to about 7 mm results in considerable weakening of the zone in which said guide meets the central portion of the lever, which means that as the slider cannot be fixed in proximity to said zone the adjustment range of the slider has to be considerably limited in order to prevent breakage.

SUMMARY OF THE INVENTION

The object of the present invention is to obviate said drawbacks by providing a main lever for high-speed rotary dobbies which is structurally much stronger than current ones, is able to support much higher loads on the main coupling pin to the crank arm as it allows the use of bearings for the crank arm big end which are longer axially than the current 6 mm, and in fact of length up to 8 mm, so allowing simple maintenance and/or replacement of said bearing for the crank arm big end as a removable main pin can be used of the type described in said prior patent application, and moreover which allows a considerable increase in its adjustment range by using a slider of smaller length which can be reliably locked onto the lever curved guide with a clamping force an order of magnitude less than the currently required clamping force, and also, depending on the type of application, allows the drive arm for the lever systems which operate the frames to be hinged to said slider either at the dobby end or at the loom end, and is finally much more economical as it requires practically no machining.

This object is substantially attained in that the main lever is a composite lever with two opposing sidepieces of gauged metal plate of about 2.5 mm thickness or more and then joined together by a special annular spacer hub which is fixed in position by pressing. The sidepieces must be joined together without welding as in addition to being costly it always results in deformation and twisting of the sidepieces, which would unacceptably reduce the already small clearances between one lever and the adjacent levers in the row, and which is necessary to allow the various levers to move without rubbing against each other in spite of the inevitable vibration and lateral elastic deformation which the sidepieces undergo by virtue of the loads transmitted during operation, these loads alternating on the main levers and reaching high values exceeding 1000 kg in the case of high-speed rotary dobbies.

The two sidepieces are fixed in position without even minimally altering the central thickness of the hub which, acting as a thrust bearing for the stack of main levers, must be constructed with very narrow tolerances in that any alterations would be multiplied by the number of levers used, and would thus become intolerable.

In this respect, such a construction has a series of advantages, the most important of which is that the blanking operation which produces the sidepieces can also easily produce two opposing holes with frustoconically flared lips as required for using a removable through main pin for the lever-crank arm coupling, and two concentric annular recesses about said holes for housing big end bearings having an increased axial length, which can now be as much as 8 mm, with a consequent considerable increase in the loading capacity, while keeping the overall size of the dobby unchanged. A further advantage is that said spacer hub can be constructed of a material different from that of the lever, and in particular of a material which is specifically resistant to wear by rubbing and/or can undergo special treatment such as sulphinization induction hardening etc.

A further advantage is that the slider can now reach closer to the lever fulcrum without the lever having to be weakened, with a consequent increase in the adjustment range. It becomes possible to hinge the drive arm for the frame-operating lever systems at the dobby end. A slider of lesser thickness can be used resulting in a reduction of about 20% in the overall length of the dobby if for loom requirements a further transmission lever has to be added to the dobby.

A further advantage of this double-sided lever is that it becomes possible to reinforce the zone in which the curved guide joins up with the main lever structure, this being the critical zone of maximum bending stress in these levers especially if the slider has to be located at that end of the guide more distant from the fulcrum. This is attained in a simple and immediate manner by interposing between the two sidepieces, in correspondence with said critical zone, a reinforcement block. It is apparent that said reinforcement block or layer, having a thickness of abut 6 mm, is applied only for the final levers of the stack of dobby main levers, for which, as is well known, the sliders have to be locked in the medium-high zone of their curved guide, this being very simple and economical to do and resulting in effective specific strengthening in the most flexurally stressed zones. Since the sidepieces of the lever are produced by blanking, it is possible to form curved guides of greater width and hence greater strength without any cost increase in that the blanking cost depends only on the dimensions of the metal plate used and not on the dimensions of the blanked piece, in contrast with solid levers of the state of the art for which greater dimensions mean more machining and thus higher costs.

According to a further characteristic of the present invention, said sidepieces are kept joined together at the free upper end of the curved guide by a spacer block which is bolted to the two sidepieces. Said block, having a thickness of about 12 mm, has the double purpose of guiding the main lever in its movement by sliding relatively along the spacer blocks of the adjacent levers, and of ensuring perfect vibration damping during movement at very high speed. This damping is in fact of maximum efficiency as it acts at maximum distance from the center of rotation and is also extremely economical as the block can be moulded of plastics material with high rubbing resistance, and with the further advantage of lower inertia because of the low weight of such a plastics block.

DETAILED DESCRIPTION OF THE INVENTION

The invention is described in greater detail hereinafter with reference to the accompanying drawings, which illustrate some preferred embodiments by way of non-limiting example only, in that technical and constructional modifications can be made thereto but without leaving the scope of the present invention.

DESCRIPTION OF THE PREFERRED EMBODIMENT

Figure 1:
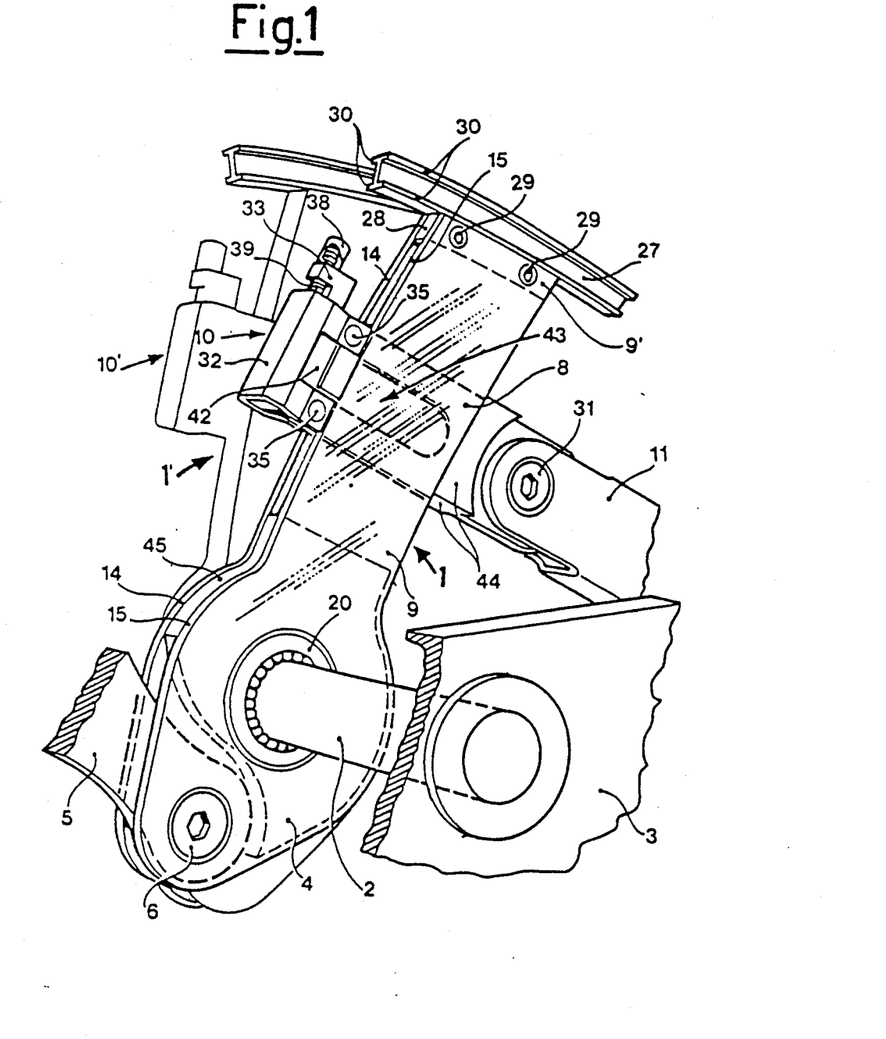
FIG. 1 is a partial perspective view of two adjacent main levers according to the invention, of which one is shown only in outline form, for a high-speed dobby.
Figures 2, 3:
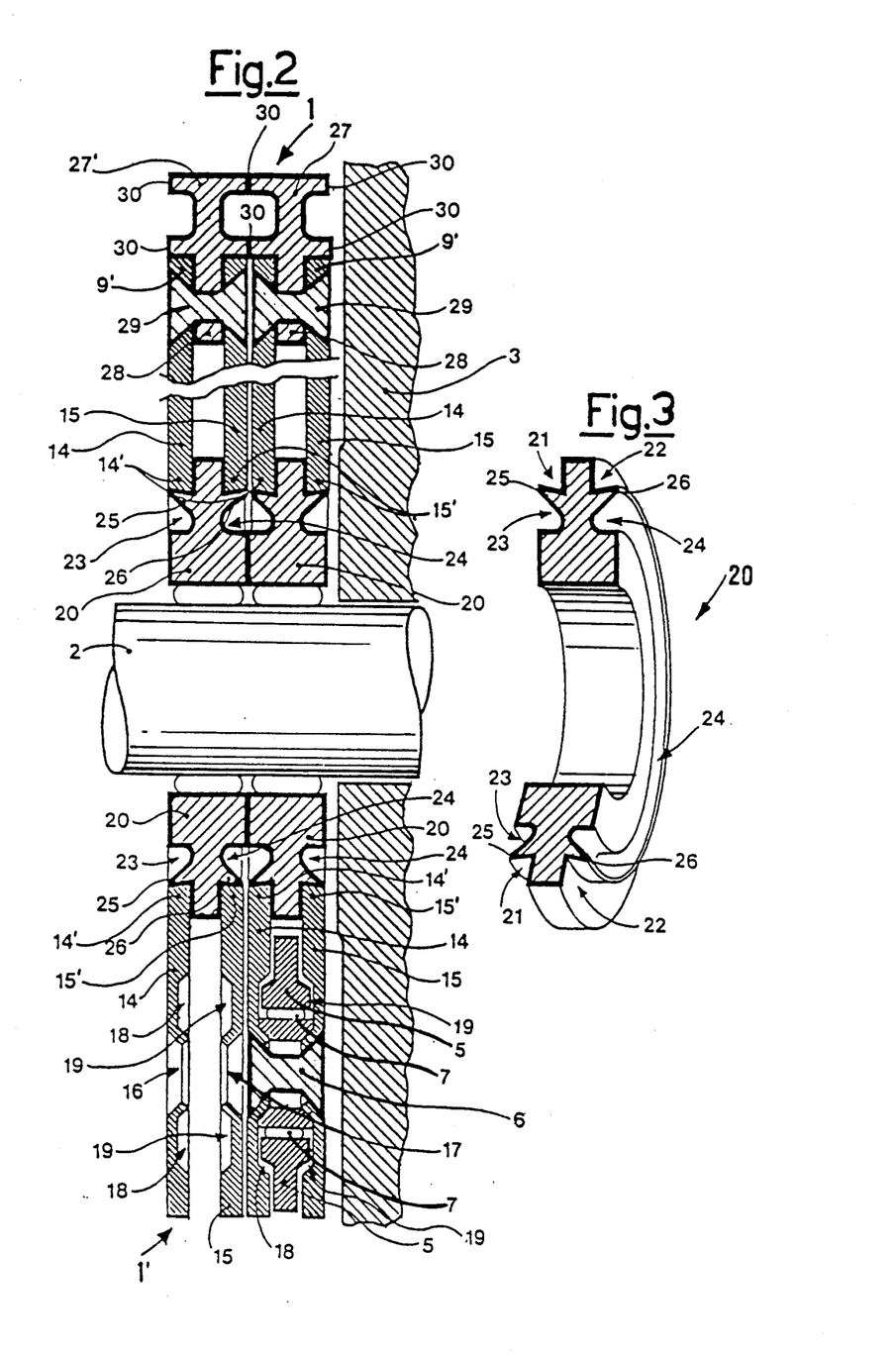
FIG. 2 is a partial front section through FIG. 1 to an enlarged scale, with the slider zone omitted.
FIG. 3 is a partial perspective view to an enlarged scale showing the annular spacer hub of the lever according to the invention.
Figure 6:
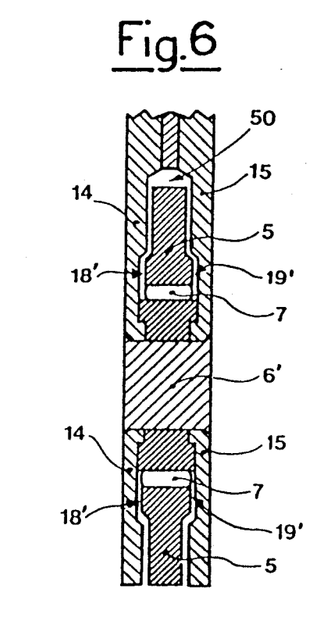
FIG. 6 is an enlarged section on the line VI—VI of FIG. 5.

With reference to the FIGS., 1 or 1' indicates overall the main lever, of standardized 12 mm thickness, of a a rotary dobby pivoted on the shaft 2 supported by the fixed dobby structure 3 and pivoted in its central portion 4 to the big end of a crank arm 5 of about 6 mm thickness by a main coupling pin 6 and a rotation bearing 7 (see FIG. 2 or 6).

The slider 8 of the lever 1, lockable in position along the constituent curved guide 9 of the lever by a locking system 10, is hinged by a drive arm 11, either directly or indirectly via a transmission lever 12 (see FIG. 4), to the lever systems 13 for operating the loom heddle frames, not shown in the figure. Said main lever 1 (see specifically FIGS. 1 to 3) is made composite with two opposing sidepieces 14 and 15 of gauged metal plate of thickness 2.5 mm and are thus elastic, they being produced by fine blanking, this operation also forming in them two opposing holes 16 and 17 with frusto-conically flared lips (see FIG. 2), this enabling a main coupling pin 6 of removable type to be used, and two inner annular recesses 18 and 19 concentric with said holes 16 and 17 respectively, to enable a bearing 7 of an increased axial length of 8 mm instead of 6 mm to be housed, the bearing being able to be easily inserted and removed once the pin 6 has been extracted, because the two sidepieces can be moved apart elastically without excessive force.

The two sidepieces 14 and 15 are joined together at a distance apart of about 6 mm by an annular spacer hub 20, which acts as a fulcrum for the lever 1 and is fixed in position by a crushing operation in a press without introducing deformation or twisting of the sidepieces. For this purpose said spacer hub 20, which can also be constructed of a material different from that of the lever, comprises at its two outer edges two opposing annular recesses 21 and 22 for receiving and acting as a shoulder for the edges 14' and 15' (see FIG. 2) of the corresponding holes in the two sidepieces 14 and 15, and two opposing annular grooves 23 and 24 which with said recesses 21 and 22 form the two annular projections 25 and 26 to be crushed in a press to lock the two sidepieces 14 and 15 in position. These latter are also kept joined together at the upper free end 9' of the curved guide 9 by a spacing and vibration-damping block 27 of 12 mm thickness and having a curved profile with its center at the lever rotation fulcrum. Said block 27, which can also be of plastics material of high rubbing resistance, is of double T cross-section with a narrow appendix 28 which is inserted between the sidepieces 14 and 15 and is fixed thereto by the bolts 29. The lateral edges 30 of the flanges of the double T of the block 27 form the sliding surfaces between the adjacent spacing and vibration damping blocks of the lever (see specifically FIG. 2).

Said slider 8 passes through the interior between the the two constituent sidepieces 14 and 15 of the curved guide 9 of the lever, and is hinged to said drive arm 11 at the loom end by the pin 31 and is locked in position along the curved guide 9 by the locking system 10 which acts at the dobby end.

Said locking system 10 consists substantially (see specifically FIG. 7) of a box 32 acting as a guide and shoulder within its cavity 32' for two opposing wedges 33 and 34, the box being fixed to the non-hinged end of the slider 8 by rivets or welds 35 through the holes 36 in the box 32 and through the corresponding holes 37 in the slider 8.

Figure 7:
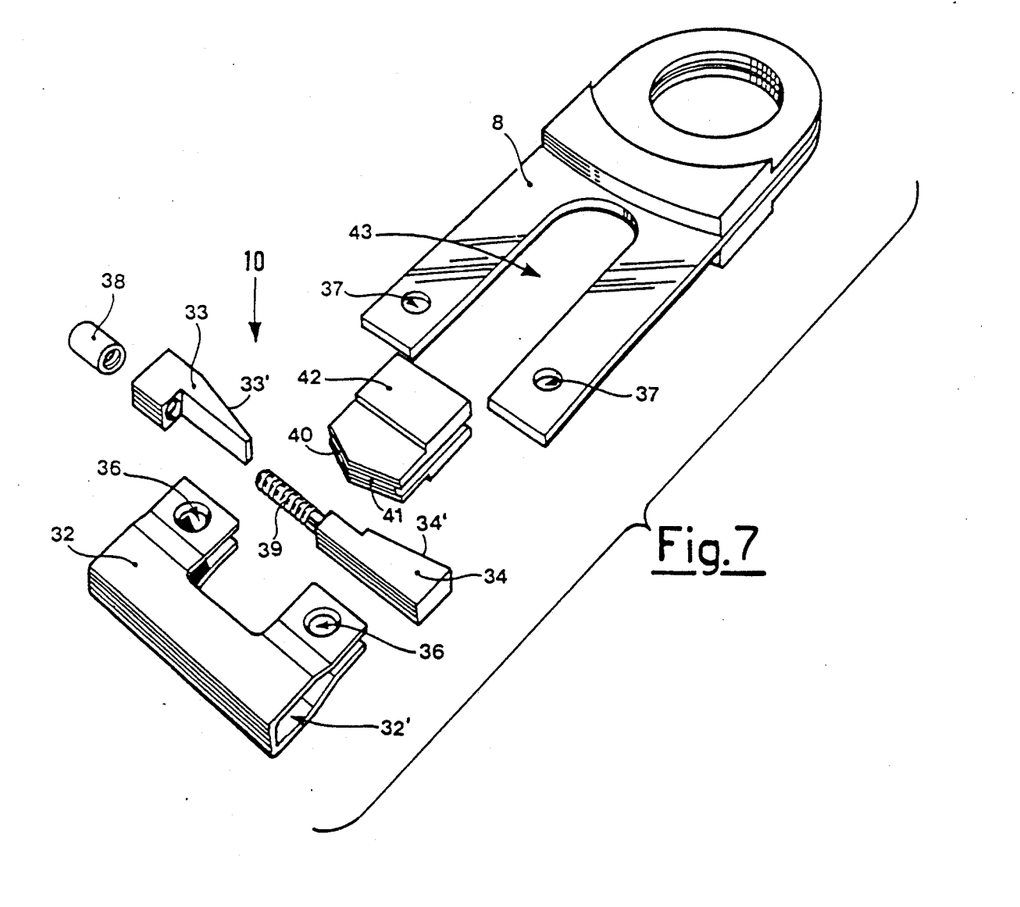
FIG. 7 is an exploded perspective view to an enlarged scale showing the passing slider and the means for locking it in position, according to the invention.

The two said wedges 33 and 34 are adjustable in terms of their relative position by the action of the nut 38 acting on the threaded shank 39 of the wedge 34, which passes through the other wedge 33.

The two inclined surfaces 33' and 34' of the wedges 33 and 34 cooperate with the corresponding inclined surfaces 40 and 41 of a locking bar 42 slidable in a central cavity 43 provided for this purpose in the slider 8. Said locking bar 42 cooperates with one of the lateral edges of the two sidepieces 14 and 15 forming the curved guide 9 while the other edge cooperates with suitable projections 44 provided at the hinged end of the slider 8.

In FIG. 1 the reference numeral 45 indicates a reinforcement block which is interposed between the two sidepieces 14 and 15 at the zone in which the curved guide 9 joins up with the central portion 4 of the lever, this being used if the slider 8 has to be locked in medium-high positions in the guide.

Figure 4:
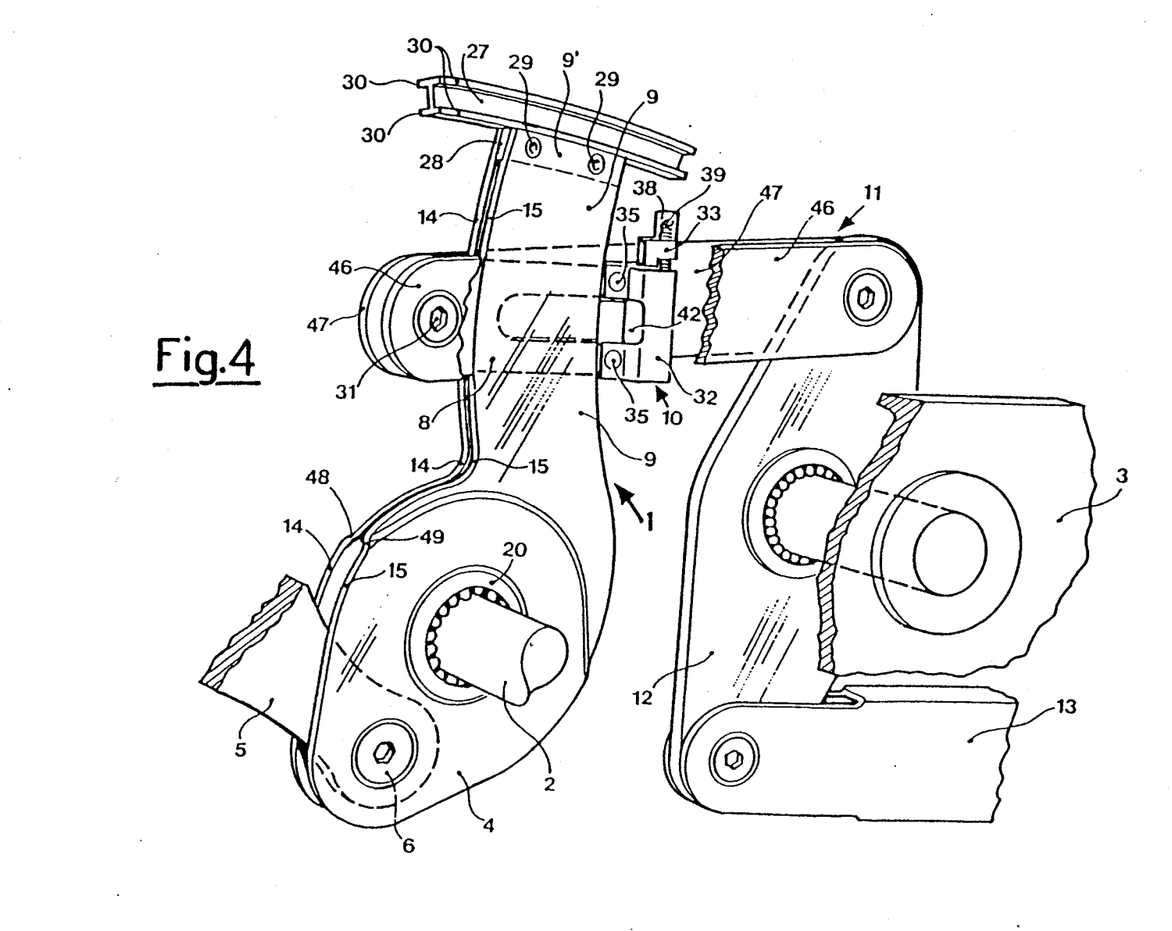
FIG. 4 is a partial perspective view of a modified embodiment of a main lever for a high-speed rotary dobby.

FIG. 4 shows a modification of the invention in which the slider 8, passing between the constituent sidepieces 14 and 15 of the curved guide 9 of the lever, is hinged to the control arm 11 not at the loom end but instead at the dobby end by the pin 31'. For this purpose said arm 11 is formed with two opposing cheeks 46 and 47 which pass on the outside of said two sidepieces 14 and 15 of the guide 9, these latter having to be consequently arranged closer to each other to maintain the total thickness constant at 12 mm. This can be done by making two opposing bends 48 and 49 in the sidepieces by means of a press, with the result that the interspace between the sidepieces is narrowed and the thickness of the slider 8 has therefore to be reduced.

Figure 5:
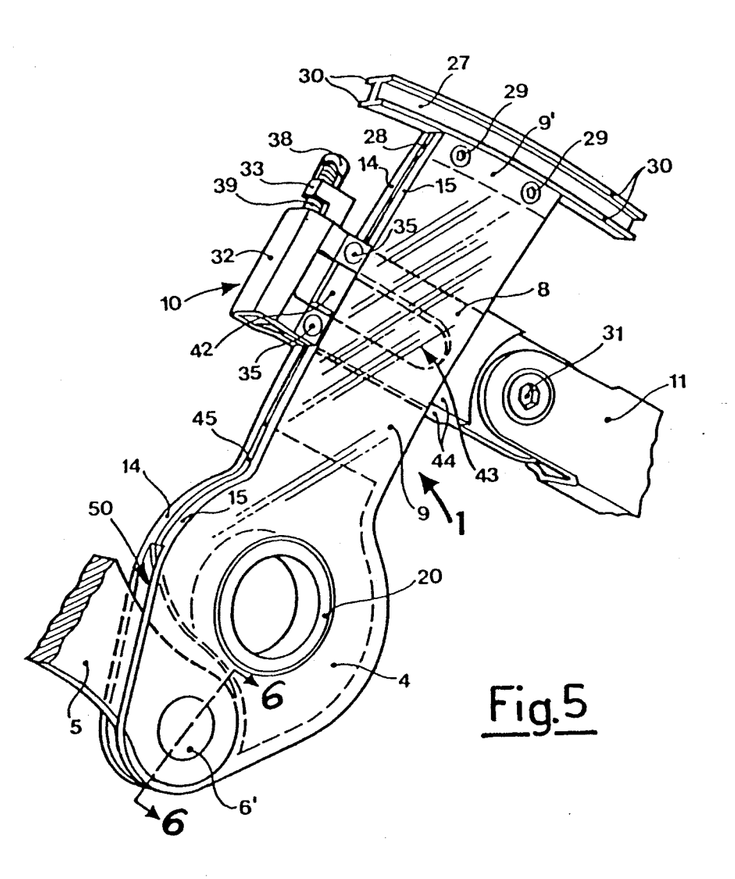
FIG. 5 is a partial perspective view of a modified embodiment of a main lever for a high-speed rotary dobby.

Finally, FIGS. 5 and 6 show a further modification of the invention for forming an extremely strong lever. In this case the sidepieces 14 and 15 are formed by blanking flat rigid plates of about 4 mm thickness, these then being machined by milling to form the cavity 50 for the big end of the crank arm 5, which is now pivoted by a no longer removable main pin 6', and to form the inner annular recesses 18' and 19' (see FIG. 6) to house a bearing with an increased axial length of 8 mm.

Thus, the main lever for the fast rotary dobby of a high-speed loom, having a standardized 12 mm thickness and comprising a pivoted central portion to which the big end of a crank arm is pivoted by a main coupling pin and a rotation bearing, and a curved guide for a slider which is hinged via a drive arm to the lever systems for operating the heddle frames of the loom, means being also provided for locking said slider in position along said curved guide, is characterized according to the present invention by being of composite construction with two opposing sidepieces of gauged metal plate produced by an economical fine blanking, this operation also forming in the sidepieces two opposing holes with frusto-conically flared lips for said main coupling pin which can now be of removable type, and two inner annular recesses concentric with said holes for housing a bearing of increased axial length, said sidepieces being joined together by an annular spacer hub acting as the fulcrum for the lever and comprising at its two outer edges two opposing annular recesses for receiving and acting as a shoulder for the edges of the two corresponding holes in said two sidepieces, and two opposing annular grooves which with said recesses form two annular projections which are crushed in a press in order to fix the two sidepieces in position, these latter also being kept joined together, in a position corresponding with the free upper end of the curved guide, by a spacing and vibrationdamping block which has a thickness of about 12 mm and a curved profile with its center at the fulcrum about which the lever rotates, and is bolted between the sidepieces, said slider passing internally between the two constituent sidepieces of the curved guide of the lever.

According to a modification of the present invention, said slider passing internally between the two constituent sidepieces of the curved guide of the lever is hinged at the dobby end, instead of at the loom end, to said drive arm for the lever systems which operate the loom heddle frames, by using a drive arm comprising two opposing cheeks which pass on the outside of said two constituent sidepieces of the curved guide of the lever, these latter being consequently positioned suitably closer together and the slider being reduced in thickness.

According to a preferred embodiment of the present invention said positioning suitably closer together of the constituent sidepieces of the curved guide of the lever is attained by making two opposing bends in the sidepieces by pressing.

It is however apparent that such a main lever can be constructed differently in practice according to the particular application. Thus for very large loads corresponding to loom speeds in excess of 1000 r.p.m. the lever according to the invention is made very strong with sidepieces which are no longer relatively thin and therefore elastic but rigid with about 4 mm thickness each and flat, they being machined (milled) at the main pin and in the working zone of the big end of the crank arm to reduce the thickness to about 2.5 mm to thus create the space of about 6 mm required for said big end as in the preceding versions, and to form the annular recesses for the bearing, which in this case would have an increased axial length of about 8 mm.

It is also apparent that in this version a removable main pin can no longer be used as it is not possible to form the necessary frusto-conically flared elastic lips in the relative opposing holes, and there is no longer the necessary elasticity of the sidepieces to enable them to be bent apart to extract a removable pin.

According to a further characteristic of the present invention, the zone in which said guide meets said central portion of the lever is reinforced in the case of those levers having the sliders locked in a medium-high position on the guides, by interposing between the two sidepieces a reinforcement block which is then welded or cemented thereto and extends about half way up the curved guide.

According to a preferred embodiment of the present invention said annular spacer hub acting as the lever fulcrum is constructed of a material different from that of the lever, namely a material of high resistance to rubbing and/or able to undergo special surface treatment such as sulphinization induction hardening, etc.

According to a further preferred embodiment of the invention said spacing and vibration-damping block is of low-weight construction in a plastics material of high resistance to rubbing.

Finally, according to a further preferred embodiment of the present invention which allows the slider to be locked onto the curved guide effectively and reliably, with lesser longitudinal extension and a very low locking force, said means for locking said slider in position along said curved guide consist of a box acting as a guide and shoulder for two opposing wedges and fixed to the non-hinged end of said slider, said wedges being adjustable in their relative position by a nut acting on the threaded shank of one of said wedges and passing through the other wedge, and having their inclined surfaces cooperating with corresponding inclined surfaces of a locking bar slidable in a central cavity provided for this purpose in the slider, said locking bar itself cooperating with one of the lateral edges of the two constituent sidepieces of the curved guide, the other edge being in cooperation with suitable projections on the hinged end of the slider.

In this manner, by simply tightening said nut to pull the two wedges together, their inclined surfaces forcibly urge said locking bar against a lateral edge of the two sidepieces of the curved guide, so effectively locking the slider onto said curved guide. Again, as the screw-type locking device now acts in the direction of the guide axis, in addition to being longitudinally shorter it is also much simpler to operate.

I claim:

1. A main lever for a fast rotary dobby of a high-speed loom, having a standardized 12 mm thickness and comprising a pivoted central portion to which a big end of a crank arm is pivoted by a main coupling pin and a rotation bearing, and a curved guide for a slider which is hinged via a drive arm to lever systems for operating heddle frames of the loom, means being also provided for locking said slider in position along said curved guide, said main lever being of composite construction with two opposing sidepieces of gauged metal plate, said sidepieces being produced by fine blanking, said fine blanking also forming in said sidepieces two opposing holes with edges and with frusto-conically flared lips for said main coupling pin, said main coupling pin being of removable type, and said fine blanking also forming two inner annular recesses concentric with said holes for housing a bearing of increased axial length, said sidepieces being joined together by an annular spacer hub acting as a fulcrum for the lever and said spacer hub comprising at its two outer edges two opposing annular recesses for receiving and acting as a shoulder for the edges of the two corresponding holes in said two sidepieces, and two opposing annular grooves which with said receses form two annular projections which are crushed in a press in order to fix the two sidepieces in position, the sidepieces also being kept joined together, in a position corresponding with a free upper end of the curved guide, by a spacing and vibration-damping block which has a thickness of about 12 mm and a curved profile with its center at the fulcrum about which the lever rotates, and is bolted between the sidepieces, said slider passing internally between the two constituent sidepieces of the curved guide of the lever.

2. A main lever for a rotary dobby as claimed in claim 1, wherein said slider passing internally between the two constituent sidepieces of the curved guide of the lever is hinged at a dobby end to said drive arm for the lever systems which operate the loom heddle frames, said drive arm comprising two opposing cheeks which pass on the outside of said two constituent sidepieces of the curved guide of the lever.

3. A main lever for a rotary dobby as claimed in claim 2, said constituent sidepieces of the curved guide of the lever further comprise two opposing bends which are produced by pressing.

4. A main lever for a rotary dobby as claimed in claim 1, wherein said slider is locked in a medium-high position in the guide and a zone in which said curved guide is joined with a central portion of the lever is reinforced by interposing between the two sidepieces a reinforcement block which is welded or cemented thereto.

5. A main lever for a rotary dobby as claimed in claim 1, wherein said annular spacer hub acting as the lever fulcrum is constructed of a material different from that of the lever, said material being of a high resistance to rubbing and/or able to undergo special surface treatment such as sulphinization, or induction hardening.

6. A main lever for a rotary dobby as claimed in claim 1, wherein said spacing and vibration-damping block is of low-weight plastics material construction of high resistance to rubbing.

7. A main lever for a rotary dobby as claimed in claim 1, wherein said means for locking said slider in position along said curved guide comprise a box acting as a guide and shoulder for two opposing wedges and fixed to a non-hinged end of said slider, said wedges being adjustable in their relative position by a nut acting on a threaded shank of one of said wedges and passing through the other wedge, and having their inclined surfaces cooperating with corresponding inclined surfaces of a locking bar slidable in a central cavity provided for this purpose in the slider, said locking bar itself cooperating with one of the lateral edges of the two constituent sidepieces of the curved guide, the other edge being in cooperation with projections on the hinged end of the slider.

* * * * *